(12) United States Patent
Stender et al.

(10) Patent No.: US 9,333,955 B2
(45) Date of Patent: May 10, 2016

(54) ELECTROPNEUMATIC BRAKE SYSTEM FOR A TOWED VEHICLE

(71) Applicant: WABCO GmbH, Hannover (DE)

(72) Inventors: Axel Stender, Hameln (DE); Ulrich Weihe, Garbsen (DE)

(73) Assignee: WABCO GmbH, Hannover (DE)

( * ) Notice: Subject to any disclaimer, the term of this patent is extended or adjusted under 35 U.S.C. 154(b) by 55 days.

(21) Appl. No.: 14/566,038

(22) Filed: Dec. 10, 2014

(65) Prior Publication Data

US 2015/0175138 A1     Jun. 25, 2015

(30) Foreign Application Priority Data

Dec. 19, 2013 (DE) .......................... 10 2013 021 681

(51) Int. Cl.
 *B60T 8/17* (2006.01)
 *B60T 8/1755* (2006.01)
 *B60T 8/176* (2006.01)
 *B60T 8/1761* (2006.01)

(52) U.S. Cl.
 CPC .............. *B60T 8/1708* (2013.01); *B60T 8/176* (2013.01); *B60T 8/1755* (2013.01); *B60T 8/17616* (2013.01)

(58) Field of Classification Search
 CPC ..... B60T 8/1708; B60T 8/1755; B60T 8/176; B60T 8/17616
 USPC ......................................... 303/3, 15, 7, 9, 123
 See application file for complete search history.

(56) References Cited

U.S. PATENT DOCUMENTS

| | | | |
|---|---|---|---|
| 6,264,289 B1 * | 7/2001 | Franke .................. | B60T 8/1755 188/158 |
| 8,267,485 B2 * | 9/2012 | Barlsen ..................... | B60T 7/20 303/123 |
| 2003/0025388 A1 * | 2/2003 | Roether .................. | B60T 8/327 303/15 |
| 2013/0304343 A1 * | 11/2013 | Feyerabend ............ | B60T 13/66 701/70 |

FOREIGN PATENT DOCUMENTS

| | | |
|---|---|---|
| DE | 103 33 182 A1 | 2/2005 |
| DE | 10 2008 022 026 A1 | 11/2009 |
| GB | 2 449 216 A | 11/2008 |

* cited by examiner

*Primary Examiner* — Melanie Torres Williams
(74) *Attorney, Agent, or Firm* — Kramer Levin Naftalis & Frankel LLP

(57) ABSTRACT

In an electropneumatic brake system for a towed vehicle having at least two axles, such as a drawbar trailer, one axle is assigned a first modulator at least with an anti-lock function and another axle is assigned a second modulator at least with an anti-lock function and an additional function. Both modulators are connected to a reservoir pressure, and both modulators load wheel brake cylinders via brake pressure lines. The second modulator is connected to a control line and the first modulator has a connector for a control line. A control line leads from the connector for the control line on the first modulator to the brake pressure line between the second modulator and at least one of its wheel brake cylinders.

8 Claims, 3 Drawing Sheets

ELECTROPNEUMATIC BRAKE SYSTEM FOR A TOWED VEHICLE

CROSS-REFERENCE TO RELATED APPLICATION

This application claims priority to/the benefit of DE 10 2013 021 681.8 filed on Dec. 19, 2013, the disclosure of which is hereby incorporated herein by reference in its entirety.

FIELD OF THE INVENTION

The present invention generally relates to electropneumatic brake systems for towed vehicles.

BACKGROUND OF THE INVENTION

Commercial vehicles have pneumatic brake systems that are linked to electronically controlled functions in order to improve safety. Herein, the overall system is referred to as an electropneumatic brake system. A stipulated constituent part of brake systems in commercial vehicles is an anti-lock function in many countries.

The anti-lock function can be realized in different ways. In one simple embodiment for two axles, the rotational speeds of the wheels of the two axles are detected. Each wheel is assigned a rotational speed sensor, and each axle is assigned a dedicated modulator with a control unit. Each axle is therefore a constituent part of what is known as a 2S1M configuration. Towed vehicles with a 2S1M configuration on each axle are ubiquitous in the United States.

Somewhat more precise regulation is possible by way of more complicated systems, for example in a 4S3M configuration. In this configuration, four rotational speed sensors on two axles interact via a common control unit with three modulators. This type of configuration is relatively complex, however.

In addition to the antilock function, the electropneumatic brake system cart have further functions—for example, to solve a particular set problem for towed vehicles, in particular drawbar trailers. If a towed vehicle navigates a band in the roadway too rapidly, the towed vehicle can turn over and drag the towing vehicle or the tractor vehicle with it or can become detached therefrom. In such a situation, the driver may notice the tipping process too late—namely, not until the driving behavior of the traction engine is affected.

In order to avoid situations in which the towed vehicle threatens to turn over, an additional stability function can be integrated into the brake system. Applicant provides a known electronic brake system (EBS) with an additional stability function, namely, what is known as roll stability support (RSS). A current stability factor is calculated continuously by e stability function on the basis of the available data. As soon as a limiting value is exceeded, the towed vehicle is braked automatically by way of the stability system until a non-critical speed is undershot. Instead of the stability function or in addition thereto, other functions can also supplement the anti-lock function.

SUMMARY OF THE INVENTION

Generally speaking, it is an object of the present invention to provide a brake system for a towed vehicle with an anti-lock function and at least one additional function, the brake system having a configuration that is less complex than a 4S3M configuration.

In an embodiment of the present invention, an electropneumatic brake system is provided for a towed vehicle having at least two axles, in particular for a drawbar trailer, one axle being assigned a first modulator at least with an anti-lock function and another axle being assigned a second modulator at least with an anti-lock function and an additional function. Both modulators are connected to a reservoir pressure and load wheel brake cylinders via brake pressure lines. Here, the second modulator is connected, moreover, to a pneumatic control line, whereas the first modulator has a connector for a pneumatic control line. A control line leads from the connector of the first modulator to the brake pressure line between the second modulator and at least one of its wheel brake cylinders. The pressure in the control line to the second modulator can be regulated by way of actuation of a service brake pedal.

Each of the two modulators is preferably part of what is known as a 2S1M configuration. At least two 2S1M configurations are therefore provided. Two wheel speed sensors are connected in each case. Each modulator actuates both wheel brake cylinders of its axle.

The first modulator controls at least one anti-lock function of its axle. The second modulator likewise controls an anti-lock function of its axle and, moreover, can control an additional function that is not provided for the first modulator.

A functional connection is produced as a result of the coupling of the two modulators via the control line from the brake pressure line of the second modulator to the connector for the control line on the first modulator. As soon as the second modulator inputs brake pressure into its wheel brake cylinders in a controlled manner, this leads via the control line to the first modulator to the first modulator also inputting brake pressure into its brake pressure lines in a controlled manner.

The additional function of the second modulator can be a stability function, in particular to avoid turning over of the towed vehicle when driving around bends. To this end, the second modulator can contain a lateral acceleration sensor or can receive signals from an external lateral acceleration sensor. Further sensors or elements can also be provided specifically in order to fulfill the stability function.

The axle having the second modulator can be a rear axle and the axle having the first modulator can be a front axle. This arrangement can also be provided in a reversed manner and is dependent, in particular, on the typical load distribution along the towed vehicle. A stability function in the region of the axle with the higher axle load is advantageous.

A connecting line can be provided between the control line to the second modulator on one side and the control line on the first modulator on the other side, with a valve for shutting off the connecting line in the case of a higher pressure in the control line at the first modulator than in the control line to the second modulator. As a result, a pressure difference between the two control lines is avoided as long as brake pressure does not prevail in the control line at the first modulator.

The valve is advantageously a shuttle valve, in particular what is known as a select-high valve, with an open output o the first modulator. In the case of a higher pressure in the control line to the second modulator, pressure equalization with respect to the first modulator takes place at the same time. In the case of high pressure in the control line at the first modulator as a result of brake pressure being fed in from the second modulator, the connecting line remains closed by way of the action of the valve. The brake pressure passes completely into the first modulator.

The towed vehicle equipped with an electropneumatic brake system according to an embodiment of the present invention can be a drawbar trailer. The towed vehicle and brake system have particular application in North America on account of special conditions and legal regulations.

Still other objects and advantages of the present invention will in part be obvious and will in part be apparent from the specification.

The present invention accordingly embodies features of construction, combinations of elements, and arrangement of parts, all as exemplified in the following detailed disclosure, and the scope of the invention will be indicated in the claims.

BRIEF DESCRIPTION OF THE DRAWINGS

For a fuller understanding of the inventive embodiments, reference is had to the following description taken in connection with the accompanying drawings in which.

DETAILED DESCRIPTION OF THE PREFERRED EMBODIMENTS

Figure 1:
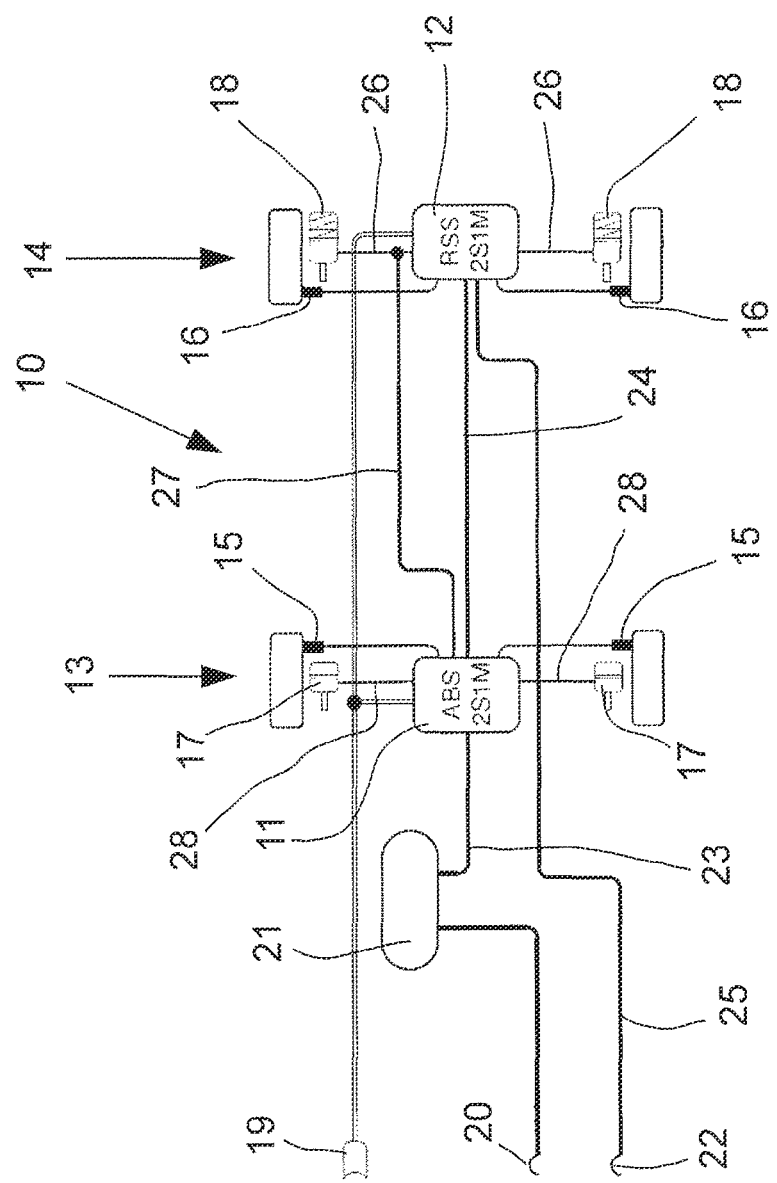
FIG. 1 is a diagrammatic illustration of an electropneumatic brake system for a drawbar trailer having two axles and two modulators in accordance with an embodiment of the present invention.

A brake system 10 according to FIG. 1 contains two 2S1M configurations. Each of the two configurations contains a modulator 11, 12 with an electronic regulator and pneumatic components. Modulator 11 is assigned to a front axle 13, and modulator 12 is assigned to a rear axle 14. Both modulators 11, 12 control an anti-lock ABS function for the respectively associated axle 13, 14. To this end, in each case two wheel speed sensors 15, 16 transmit signals to modulators 11, 12. The latter control the brake pressure in connected wheel brake cylinders 17, 18.

Modulators 11, 12 are connected via a coupling 19 (here, for example, according to the U.S. standard SAE J 560) to a power supply of a tractor vehicle (not shown). Electrical control signals are not transmitted from the tractor vehicle.

Compressed air at reservoir pressure passes via a pneumatic coupling 20 into a reservoir tank 21. In an analogous manner, control pressure is fed from the tractor vehicle to brake system 10 of the towed vehicle via a pneumatic coupling 22.

A reservoir pressure line 23 leads from reservoir tank 21 to modulator 11 of the front axle 13. A reservoir pressure line 24 connects modulators 11, 12 to one another. The reservoir pressure is preferably guided through modulator 11 from line 23 to line 24 without a throttle or the like.

A control line 25 leads from pneumatic coupling 22 to modulator 12 of the rear axle 14. If a service brake is actuated in the tractor vehicle, control pressure is fed to modulator 12 via line 25. Modulator 12 thereupon loads wheel brake cylinders 18 via brake pressure lines 26.

A control line (here, a control line 27) is likewise connected to modulator 11 of front axle 13. The control line is not connected directly to coupling 22 or line 25. Rather, control line 27 leads from one of the brake pressure lines 26 to modulator 11. The brake pressure, which is input into brake pressure lines 26 in a controlled manner, acts at the same time via control line 27 as a control pressure for modulator 11. As a result, modulator 12 and modulator 11 are in what is known as a master/slave configuration. As soon as a braking operation of rear axle 14 is triggered by modulator 12, front axle 13 also brakes via modulator 11.

In addition to the anti-lock function, modulator 12 of rear axle 14 can be equipped with a stability function RSS. In each case, one dedicated control unit is integrated into both modulators 11, 12. In order to carry out the stability function, the control unit of modulator 12 contains an additional software module and preferably a lateral acceleration sensor (not shown). By way of the signals that are present overall and vehicle-specific or assumed data, such as track, centroid height, average mass, a factor can be calculated by modulator 12 that expresses whether there is a risk of turning over for the towed vehicle in the given driving situation. If there is a risk of turning over, modulator 12 brakes the wheels of rear axle 14. Via control line 27, modulator 11 of the front axle is also activated, with the result that the wheels of front axle 13 are also braked, triggered by way of the stability function of modulator 12 on the rear axle.

Brake system 10 illustrated here is of the simplest type—namely, without a central, higher-order control unit. Each of the two axles 13, 14 is assigned merely a dedicated control unit with a modulator 11, 12 for carrying out the anti-lock ABS function. The control unit of one of the two axles 13, 14 is additionally provided with the stability function RSS, that is, it has both ABS and RSS functionalities. Only RSS is indicated in the drawing figures for the sake of simplicity.

Instead of the stability function or in addition thereto, other functions can also be realized in modulator 12, which functions are transmitted to the other modulator 11 via the illustrated master/slave configuration.

Figure 2:
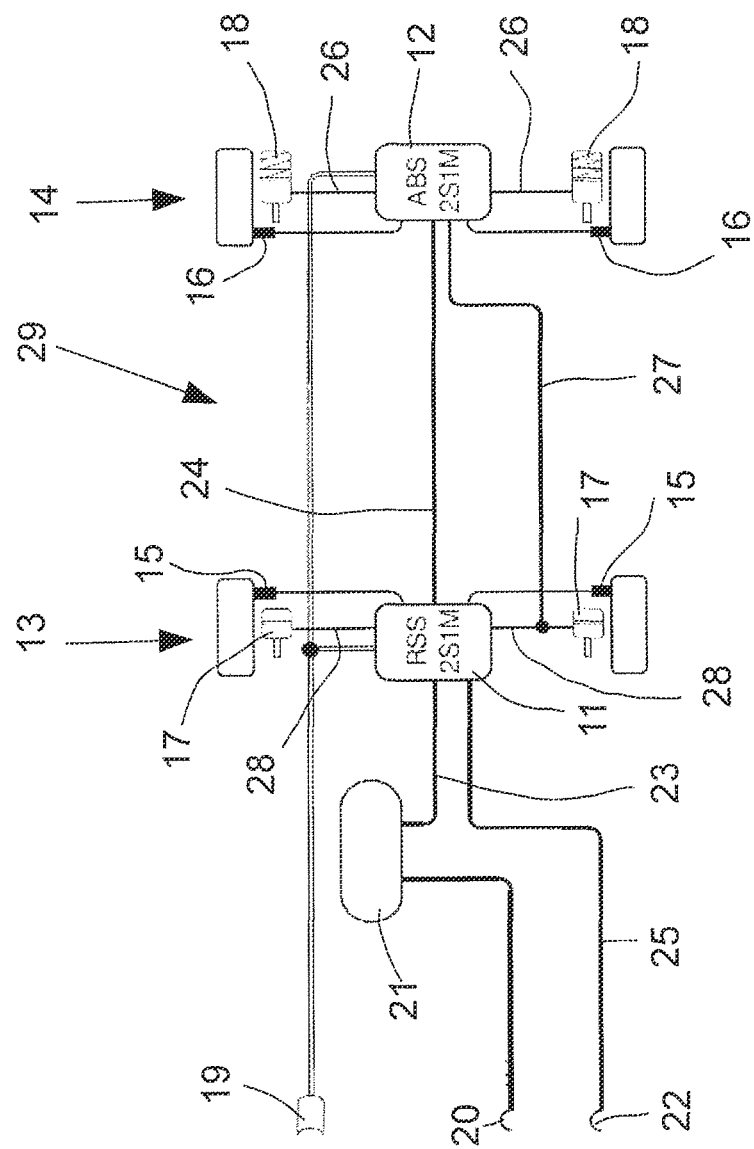
FIG. 2 shows an inventive brake system that is analogous to FIG. 1, but with swapped functions.

FIG. 2 shows a modified brake system 29 compared to brake system 10 of FIG. 1. In FIG. 2, the control line 25 is connected to modulator 11 of front axle 13. Correspondingly, control line 27 extends from one of the brake pressure lines 28 of modulator 11 to modulator 12 of rear axle 14. In comparison to FIG. 1, the master/slave configuration is a reversed configuration and the functionalities of modulators 11, 12 are swapped. As an additional function, modulator 11 of front axle 13 has the RSS stability function and feeds control pressure to modulator 12.

Figure 3:
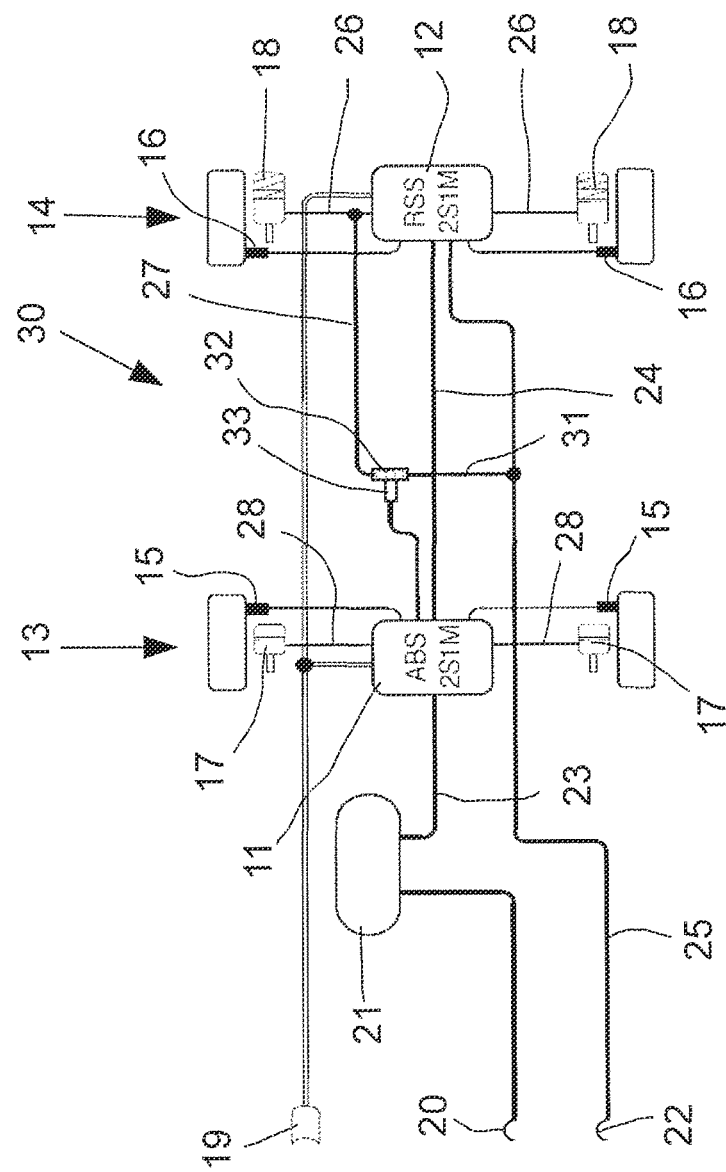
FIG. 3 shows the inventive brake system illustrated in FIG. 1 further including a connecting line between two control lines.

FIG. 3 shows a further modification—namely, a brake system 30, as an extension of brake system 10 according to FIG. 1. In addition, there is a connecting line 31 between control line 27 and control line 25. A shuttle valve 32, here in the manner of what is known as a select-high valve, is provided between the two modulators 11, 12 in the region where connecting line 31 meets control line 27. Shuttle valve 32 always feeds the high pressure through to modulator 11 in a controlled manner. Correspondingly, a valve output 33 faces modulator 11 of front axle 13, which acts as "slave" here. Shuttle valve 32 achieves a situation where a pressure difference between the two modulators 11, 12 is avoided.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. An electropneumatic brake system for a towed vehicle having at least two axles, the brake system comprising first and second modulators, the first modulator being assigned to one of the at least two axles and operable to effect at least an anti-lock function, the second modulator being assigned to another of the at least two axles and operable to effect at least an anti-lock function and an additional function, the first and second modulators being connected to a reservoir pressure and configured to load wheel brake cylinders via brake pressure lines, the second modulator being connected to a second control line, and the first modulator being connected via a connector to a first control line leading to the one of the brake pressure lines between the second modulator and at least one wheel brake cylinder of the second modulator.

2. The brake system as claimed in claim 1, wherein the additional function of the second modulator is a stability function.

3. The brake system as claimed in claim 1, wherein the one of the at least two axles assigned to the second modulator is a rear axle and the one of the at least two axles assigned to the first modulator is a front axle.

4. The brake system as claimed in claim 1, wherein the one of the at least two axles assigned to the second modulator is a front axle and the one of the at least two axles assigned to the first modulator is a rear axle.

5. The brake system as claimed in claim 1, further comprising a connecting line between the second control line connected to the second modulator on one side and the first control line on the first modulator on another side; and a valve to shut off the connecting line when pressure in the first control line at the first modulator is higher than pressure in the second control line to the second modulator.

6. The brake system as claimed in claim 5, wherein the valve is a select-high valve with an output to the first modulator.

7. A towed vehicle, comprising the electropneumatic brake system as claimed in claim 1.

8. The brake system as claimed in claim 1, wherein the towed vehicle is a drawbar trailer.

* * * * *